Figure 1:
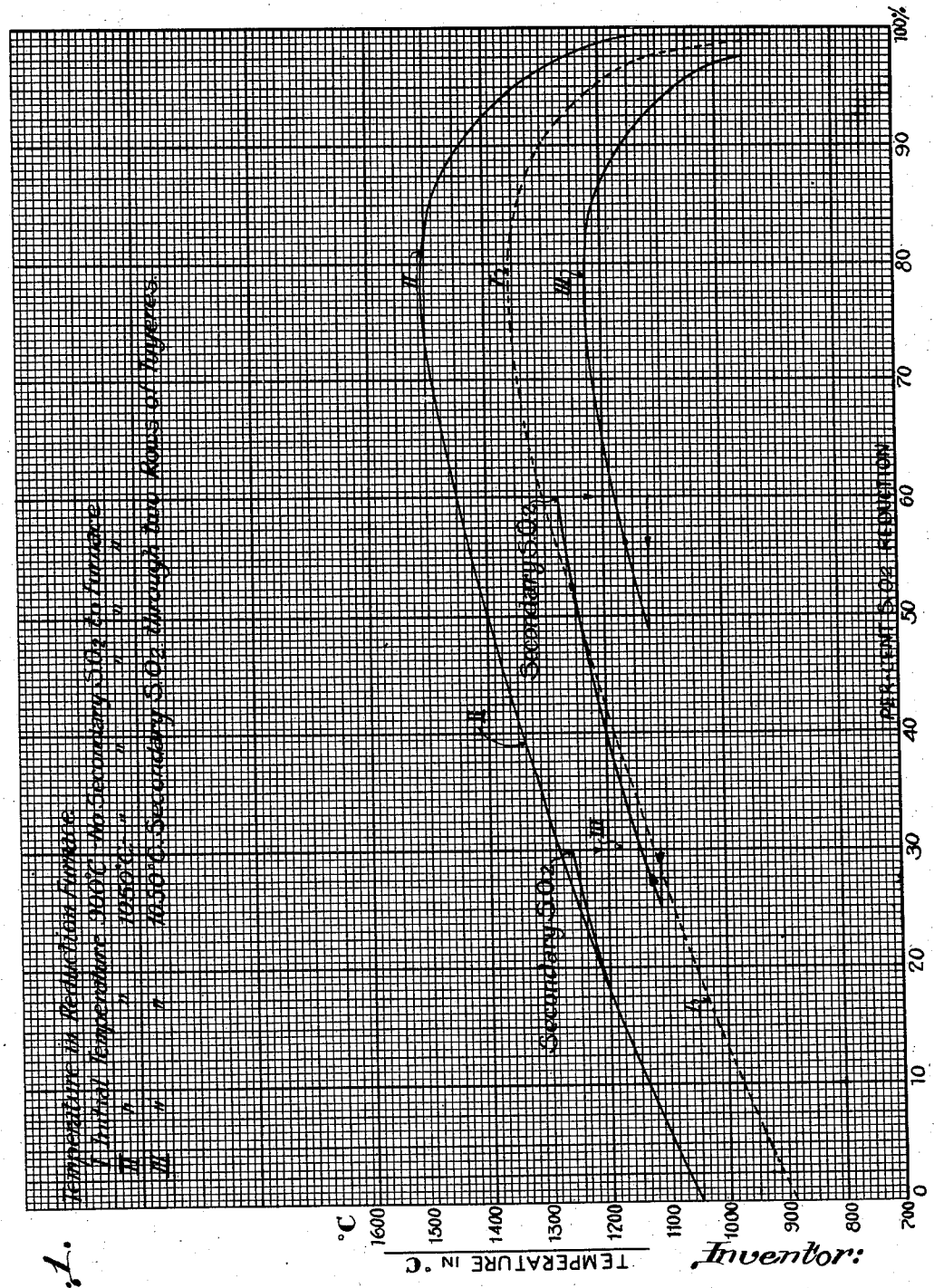

Dec. 14, 1937.                    R. LEPSOE                    2,102,081
PROCESS FOR THE REDUCTION OF SULPHUR DIOXIDE
TO ELEMENTAL SULPHUR BY MEANS OF CARBON
Filed Jan. 14, 1936                 2 Sheets-Sheet 1

Inventor:
ROBERT LEPSOE
Attorney

Patented Dec. 14, 1937

2,102,081

UNITED STATES PATENT OFFICE 2,102,081

PROCESS FOR THE REDUCTION OF SULPHUR DIOXIDE TO ELEMENTAL SULPHUR BY MEANS OF CARBON

Robert Lepsoe, Trail, British Columbia, Canada, assignor to The Consolidated Mining & Smelting Company of Canada, Limited, Montreal, Quebec, Canada, a company of Canada Application January 14, 1936, Serial No. 59,095

9 Claims. (Cl. 23—226)

This invention relates to improvements in the process for the reduction of sulphur dioxide to elemental sulphur by means of carbon characterized in that sulphur dioxide, preheated to a temperature sufficiently high to start the reducing reactions is introduced into a reducing fuel bed and the temperature of the reducing reactions is at all times positively controlled by admitting additional sulphur dioxide at higher levels of the fuel bed thereby increasing the capacity and efficiency of the process to a degree impossible to realize heretofore.

In the reduction of sulphur dioxide to elemental sulphur by means of carbon, sulphur dioxide is charged into the base of a reducing fuel bed, such as coke, in which reducing reactions take place resulting in the reduction of sulphur dioxide to sulphur and other products. The reactions which take place, however, are exothermic and the temperature rises toward the top of the furnace where it reaches such an intensity that further operation becomes difficult.

In the reduction of sulphur dioxide to elemental sulphur by means of carbon a certain initial temperature is required below which no reaction can be established. Also the rate of reduction is a function of the temperature and increases rapidly with it.

One of the objects of this invention, therefore, is to introduce sulphur dioxide into the reducing fuel bed at a high initial temperature which permits the substantially instantaneous establishment of the reducing reactions and then, by effecting a positive control over the temperature of the reactions, to maintain them within a temperature range which will bring them to completion within a minimum of time thus permitting the operation of the furnace at its highest capacity by avoiding the progressively higher temperatures which would normally result.

I have found that between 900° C. and 1400° C. essentially the following reactions take place:—

$$SO_2 + C \rightleftharpoons CO_2 + \tfrac{1}{2}S_2 + 10830 \text{ cals.} \quad (1)$$

$$CO_2 + C \rightleftharpoons 2CO - 40595 \text{ cals.} \quad (2)$$

There is very little carbon oxysulphide (COS) formed above 1000° C. and the gas velocity at which I carry out these operations does not allow sufficient time for any carbon di-sulphide ($CS_2$) formation, although thermodynamic studies predict the formation of this compound above that temperature.

The temperature coefficients of the rates of these Reactions (1) and (2) are equivalent since the energy of activation (E) in each case is found to have the same value (which in both these cases is 42,000 calories) from the relationship:

$$-E = \frac{4.6 \Delta \log k}{\Delta \frac{1}{T}}$$

where "$k$" is the reaction velocity constant and $T$ is the absolute temperature in degrees centigrade. It follows that the ratio of the rates of these reactions is constant over a wide temperature range. Therefore temperature will govern only the time required for establishing any particular ratio of the concentrations of sulphur dioxide and carbon monoxide which would co-exist at the end of that period. Thus the higher the temperature the shorter will the time of retention become for the reduction, to any particular extent, of sulphur dioxide to sulphur and of carbon dioxide to carbon monoxide, and vice versa. It will be apparent that the CO will be formed in increasing amounts as the $SO_2$ approaches complete reduction and this is shown in the following table from the relation of $SO_2$ to CO or of $SO_2$ to CO+COS (where COS is produced by a secondary reaction with sulphur vapour present according to $CO + \tfrac{1}{2}S_2 \rightleftharpoons COS$ at temperatures below 1000° C.) in the exit gas from the reduction of $SO_2$ by carbon:—

| %$SO_2$ | 50 | 30 | 20 | 10 | 5 | 1 |
|---|---|---|---|---|---|---|
| %CO | 3 | 7 | 11 | 17 | 23 | 34 |

The reaction velocity constants ("$k$") of these Reactions (1) and (2) at the same temperature are compared in the following table over a wide range of temperature and are found from the relationship:

$$k = \frac{2.3}{t} \log \left(\frac{P_1}{P_2}\right)$$

where $P_1$ and $P_2$ are the initial and final partial pressures of $SO_2$ (in Reaction 1) or of $CO_2$ (in Reaction 2) and "$t$" is the time of retention of the gases at any particular temperature:—

| Temp. °C. | $k\,SO_2$ | $k\,CO_2$ |
|---|---|---|
| 850 | 0.09 | 0.006 |
| 900 | 0.20 | 0.013 |
| 1000 | 0.80 | 0.052 |
| 1100 | 2.64 | 0.172 |
| 1200 | 7.50 | 0.490 |
| 1300 | 18.40 | 1.200 |
| 1400 | 41.10 | 2.680 |
| 1500 | 83.00 | 5.600 |

From the above it is apparent that the rate of Reaction (1) is about fifteen times faster than that of Reaction (2) and therefore the time of retention for the gases will be about fifteen times shorter in (1) than in the slower reaction (2). Both rates are approximately doubled for every 50° C. rise in temperature in the lower temperature range.

In considering the development of a hot zone in the furnace it will be seen that while the gases move upwardly through the fuel bed and $SO_2$ is being continually reduced, $P_2SO_2$ and $P_2CO_2$ will decrease and the increase in the time of retention ($t$) will favour CO formation. Reaction (1) is exothermic (heat of reaction $=\Delta H_{SO_2}$), Reaction (2) is strongly endothermic (heat of reaction$=\Delta H_{CO_2}$) and the total heat of reduction ($\Delta H_R$) is the sum of the two. I have found that the total heat of reduction is positive until about 80% of the $SO_2$ is reduced, with the result that the temperature curve reaches a peak near this point. The following figures are given for illustration. The initial temperature has been chosen as 900° C. because it appears to be the lowest temperature for practical operation for the reason that at lower temperatures these reactions are extremely slow. For other initial temperatures the temperature curves will run practically parallel to this as the changes due to temperature in $\Delta H_{SO}$ and $\Delta H_{CO_2}$ only amount to 3% per 100 C.

| Percent reduction of $SO_2$ | Peak temp. °C. | Total heat of reduction $H_R$ |
|---|---|---|
|  |  | Cals. |
| 10 | 985 | 995 |
| 30 | 1130 | 920 |
| 50 | 1250 | 778 |
| 70 | 1340 | 630 |
| 80 | 1350 | 272 |
| 90 | 1300 | −545 |
| 95 | 1170 | −998 |
| 99 | 975 | −2060 |

From these figures it will be seen that in the reduction of sulphur dioxide by means of carbon, the conditions are found to be entirely different to the usual conditions in a gas producer furnace or in any metallurgical furnace as in the former case the hottest temperature is not generated near the grate or tuyères but at a distance higher up in the furnace.

Figure 2:
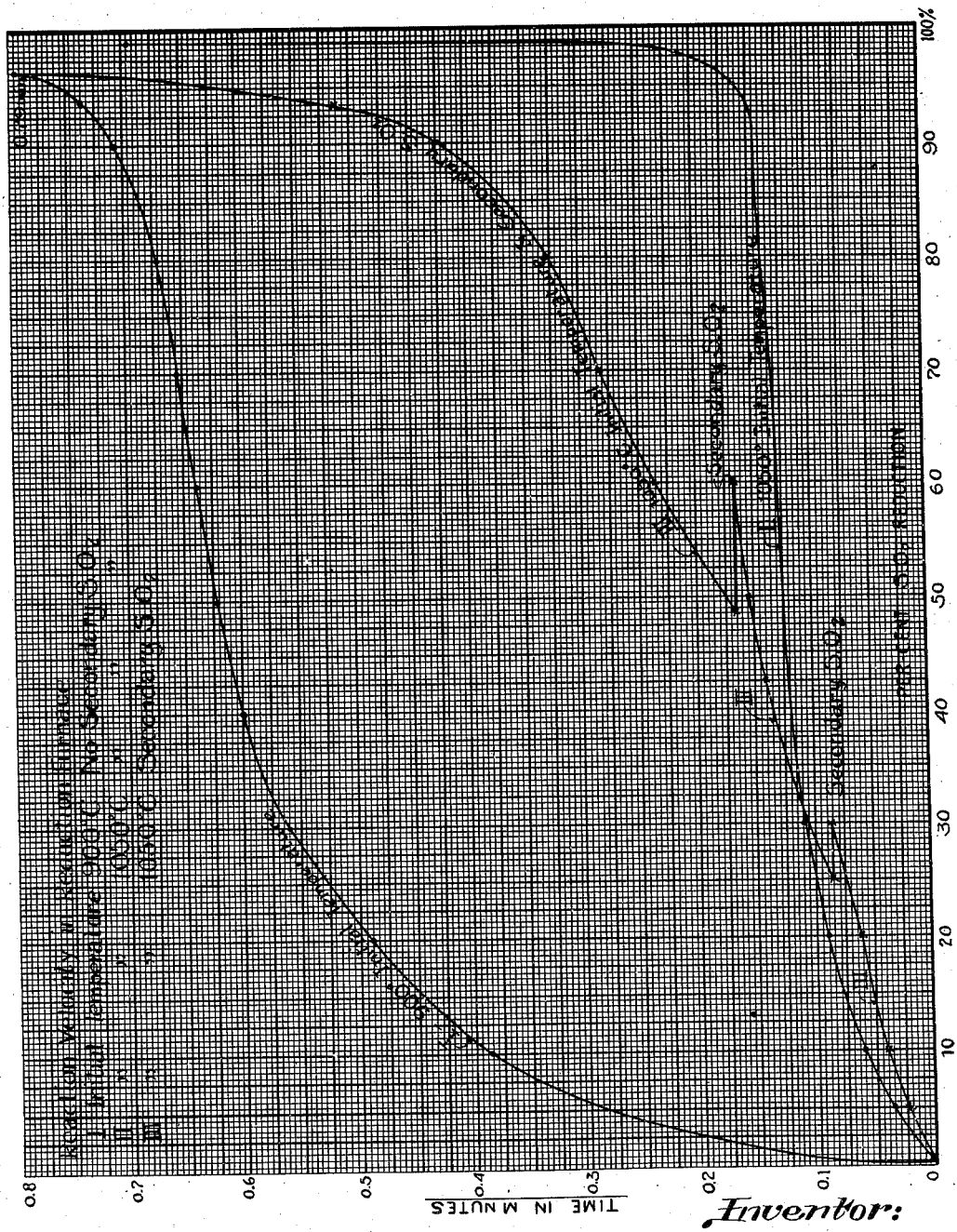

The above data is illustrated in the accompanying graphs in which, for any percentage of $SO_2$ reduction in the furnace, is shown the temperature (Fig. 1) and the time of retention (Fig. 2) resulting from:

(I) An initial temperature of 900° C. in the primary $SO_2$, no secondary $SO_2$ being added to the furnace (see curves I).

(II) An initial temperature of 1050° C. in the primary $SO_2$, no secondary $SO_2$ being added to the furnace (see curves II).

(III) An initial temperature of 1050° C. in the primary $SO_2$, secondary $SO_2$ being admitted through two rows of tuyères (see curves III).

Reference to these graphs shows that an increase in the temperature of the preheated primary sulphur dioxide greatly increases the furnace capacity, and that the simultaneous use of secondary sulphur dioxide eliminates the troubles and wasted time normally resulting from hot zones in the furnace. A further advantage of my invention is the improvement which is made in the heat economy of the process with regard to the heat required for preheating purposes. I have found also that considerably less heat is required for preheating purposes per mol. sulphur dioxide reduced in the furnace as a result of using secondary sulphur dioxide in conjunction with the preheated primary sulphur dioxide. In this way a smaller quantity of the highly preheated primary sulphur dioxide is required per mol. sulphur dioxide reduced than in the case where no secondary sulphur dioxide is used. These gains in economy are shown in the following calculations e. g. in Case (3), less energy is required for preheating purposes per mol. $SO_2$ reduced, (using preheated primary $SO_2$ and cold secondary $SO_2$) than in Cases (1) and (2) (using only preheated primary $SO_2$). In these cases, reduction of $SO_2$ to the extent of 90% is considered to occur in the furnace, and since the exit gases will contain 0.10 mol. $SO_2$, 0.21 mol. CO, 0.81 mol. $CO_2$, 0.45 mol. $S_2$, per mol. original $SO_2$, they will leave with $SO_2$ and CO in approximately the correct proportion of 1 to 2 for further conversion outside the furnace by catalysis.

Case 1

For preheating 1 mol. primary $SO_2$ to 900° C., 9900 cals. will be required and 0.9 mol. $SO_2$ will be completely reduced in 0.71 minute. Thus on the basis of 1 mol. $SO_2$ reduced to sulphur, 11000 cals. for preheating purposes and 0.79 minute time of retention will be necessary. It is found in practice (see Fig. 1, curve I) that when working with a furnace of adequate capacity a sticky zone occurs near the top of the furnace due to development of excessively high temperatures.

Case 2

With $SO_2$ preheated to 1050° C. (see Fig. 2, curve II) 90% reduction of 1 mol. $SO_2$ can occur in 0.15 minute, i. e. in one quarter the time taken in the previous case, but in practice, it is found that a zone of very bad clinkering (see Fig. 1, curve II) occurs about one quarter of the furnace height above the grate (furnace height referring to the height of the coke bed.). Since 11800 cals. will be required for preheating 1 mol. primary $SO_2$ to 1050° C. and 0.9 mol. $SO_2$ will be reduced in 0.15 minute, therefore on the basis of 1 mol. $SO_2$ reduced to sulphur, 13100 cals. for preheating purposes and 0.17 minute time of retention will be necessary.

Case 3

I have found that the clinkering and sticky zones of the furnace can be eliminated and at the same time a high reaction rate can be maintained by operating the furnace at a high initial temperature and admitting secondary $SO_2$ to the hot zones.

Thus by preheating the primary $SO_2$ to 1050° C., and by adding secondary $SO_2$ just prior to the sticky zone (1300° C.) the temperature drops to 1100° C. The temperature rises again higher up in the furnace and more secondary $SO_2$ is added prior to this point. In this way the temperature through the entire furnace is kept well below the point of stickiness and simultaneously the time of retention is reduced to about one half of the time required in Case 1. For each mol. $SO_2$ preheated to 1050° C. and added at the base of the furnace, 0.48 mol. secondary $SO_2$ is added, giving a total of 1.48 mols $SO_2$ of which 90% or 1.33 mols will be reduced in 0.42 minute, (see Fig. 2, curve III). On the basis of 1 mol. $SO_2$ reduced to sulphur, 8900 cals. will be required for preheating purposes and the time of retention will be 0.32 minute. The capacity of the furnace becomes 2¼ times greater than that in Case 1, and economy in preheating is obtained.

In the preceding examples all the figures refer to ideal conditions, that is there are no heat losses and no ash. The figures in actual operation differ only slightly, the slopes of the curves being the same but on a slightly lower level.

In operation the secondary $SO_2$ is admitted into the furnace through one or more rows of tuyères spaced at various levels throughout the furnace height, the furnace height referring to the height of the coke bed. I have found, for example, that in operating with an initial temperature of say 1050° C. two rows of tuyères spaced at one seventh and one third of the furnace height are sufficient.

I have found further that if the initial temperature is increased to say 1150° C. clinkering and stickiness can still be avoided and the capacity of the furnace is almost doubled, but it would be necessary to add additional tuyères, say a third row. In this latter case the mean reducing temperature would be approximately 1225° C. as against 1150° C. which would result from the use of the first mentioned temperature, i. e. 1050° C.

Part of the sulphur dioxide to be reduced is preheated prior to entering the base of the furnace; the balance of the sulphur dioxide, or substantially the balance since a small amount may be needed for an auxiliary adjustment of the final gas reaction outside the furnace, enters through a number of inlet ports or tuyères in one or more rows above the base of the furnace in the hot zone area.

The primary sulphur dioxide may be preheated by any of the well-known methods, for example by using an auxiliary furnace such as an electric arc furnace of the Schonherr type, a fire tube furnace or a fire-brick checkerwork regenerator. Greater economy is obtained by preheating cold sulphur dioxide by heat exchange with the hot exit gases from the reduction furnace prior to preheating in an auxiliary furnace. I prefer, however, rather than to use an auxiliary furnace, to develop an initial temperature of approximately 1150° C. in the reduction furnace by mixing regulated amounts of an oxidizing gas such as air, oxygenated air, or pure oxygen with the sulphur dioxide prior to injection into the reduction furnace. If necessary this mixture is first preheated by heat exchange with the hot exit gases from the reduction furnace.

In the event that it is desired to preheat the sulphur dioxide by means of an auxiliary furnace such as a high tension electric arc furnace of the Schonherr type it is necessary to add a small amount of another gas to the sulphur dioxide in order to give the mixture sufficient conductance.

For the sake of further economy, the secondary sulphur dioxide may be introduced at about 400° C. instead of at ordinary temperatures and is readily preheated to this temperature by heat exchange with the hot exit gases. In this manner more secondary sulphur dioxide can be admitted to the furnace than if admitted cold, for the reason that when the secondary sulphur dioxide is preheated to any suitable temperature, lower than the temperature of the hot zone below which it is injected, more sulphur dioxide is needed to produce the required amount of cooling than in the case where the secondary sulphur dioxide is not preheated.

It will be apparent from the above that the hot zones of the furnace could also be eliminated by admitting cold secondary gas of an inert nature such as nitrogen or of a partly reactive kind such as $CO_2$, either just prior to the hot zones or with the $SO_2$ at the base of the furnace. In the latter case, while a part of the excessive heat would be absorbed by the heating of the cold diluent gas, the time for heating the $SO_2$ to reduction temperature would be prolonged and the furnace capacity diminished, and a negligible cooling effect would result from the endothermic reduction of $CO_2$ by carbon, since this reaction would only produce about 3% CO under such conditions. In any case, this procedure would cause wasteful consumption of coke since the heating of the diluent gas by the cooling of the hot zones would waste heat which otherwise could be utilized. This heat is used in my inventin for heating the secondary $SO_2$ locally in these zones to a temperature favorable to reduction by exothermic reaction further up in the fuel bed. In this manner a far larger quantity of $SO_2$ is reduced than formerly in the same furnace and gains in the economy of heat and coke consumption are made thereby.

It will be clearly understood, of course, that the scope of this invention is not limited to the operation of the process at the initial temperatures and within the temperature ranges as herein disclosed. While these conditions have been found to give satisfactory results it will be apparent that variations can be made without departing from the scope of the invention.

Having thus fully described my invention, what I claim as new and desire to secure by Letters Patent is:—

1. A process for the reduction of sulphur dioxide to elemental sulphur by means of carbon which comprises introducing sulphur dioxide, at a temperature sufficiently high to establish the reducing reactions, into a reducing fuel bed consisting essentially of carbonaceous material and controlling the temperature of the reducing reactions by admitting at higher levels of the fuel bed additional sulphur dioxide at a temperature below the prevailing temperature of the reacting gases at the point of admission.

2. A process for the reduction of sulphur dioxide to elemental sulphur by means of carbon which comprises introducing sulphur dioxide, at a temperature sufficiently high to establish the reducing reactions, into the base of a reducing fuel bed consisting essentially of carbonaceous material and controlling the temperature of the reducing reactions by admitting at higher levels of the fuel bed additional sulphur dioxide at a temperature below the prevailing temperature of the reacting gases at the point of admission.

3. A process for the reduction of sulphur dioxide to elemental sulphur by means of carbon which comprises introducing sulphur dioxide, preheated to a temperature above 900° C., into the base of a reducing fuel bed consisting essentially of carbonaceous material and controlling the temperature of the reducing reactions by admitting at higher levels of the fuel bed additional sulphur dioxide at a temperature below the prevailing temperature of the reacting gases at the point of admission.

4. A process for the reduction of sulphur dioxide to elemental sulphur by means of carbon which comprises introducing sulphur dioxide, at a temperature sufficiently high to establish the reducing reactions, into the base of a reducing fuel bed consisting essentially of carbonaceous material and controlling the temperature of the reducing reactions by admitting at higher levels of the fuel bed additional sulphur dioxide preheated to a temperature below the prevailing temperature of the reacting gases at the point of admission.

5. A process for the reduction of sulphur dioxide to elemental sulphur by means of carbon which comprises introducing sulphur dioxide, preheated to a temperature sufficiently high to establish the reducing reactions, into a reducing fuel bed consisting essentially of carbonaceous material, controlling the temperature of the reducing reactions by admitting, at higher levels of the fuel bed, additional sulphur dioxide at a temperature below the prevailing temperature of the reacting gases at the point of admission and utilizing the sensible heat of the hot gaseous products of the reducing reactions to preheat fresh sulphur dioxide prior to its admission to the fuel bed.

6. In a process for the reduction of sulphur dioxide to elemental sulphur by means of carbon, the method of introducing sulphur dioxide together with sufficient oxidizing gas into a reducing fuel bed consisting essentially of carbonaceous material to generate a temperature sufficiently high to establish the reducing reactions and controlling the temperature of the reducing reactions by admitting, at higher levels of the fuel bed, additional sulphur dioxide at a temperature below the prevailing temperature of the reacting gases at the point of admission.

7. In a process for the reduction of sulphur dioxide to elemental sulphur by means of carbon, the method of sufficiently preheating the sulphur dioxide and introducing it, together with sufficient controlled amounts of an oxidizing gas, into a reducing fuel bed consisting essentially of carbonaceous material to generate a temperature sufficiently high to establish the reducing reactions and controlling the temperature of the reducing reactions by admitting, at higher levels of the fuel bed, additional sulphur dioxide at a temperature below the prevailing temperature of the reacting gases at the point of admission.

8. In a process for the reduction of sulphur dioxide to elemental sulphur by means of carbon, the method of sufficiently preheating the sulphur dioxide and introducing it, together with sufficient controlled amounts of an oxidizing gas, into a reducing fuel bed consisting essentially of carbonaceous material to generate a temperature sufficiently high to establish the reducing reactions and controlling the temperature of the reducing reactions by admitting, at higher levels of the fuel bed, additional sulphur dioxide preheated to a temperature below the prevailing temperature of the reacting gases at the point of admission.

9. In a process for the reduction of sulphur dioxide to elemental sulphur by means of carbon, the method of introducing sulphur dioxide, together with sufficient controlled amounts of an oxidizing gas, into a reducing fuel bed consisting essentially of carbonaceous material to generate a temperature sufficiently high to establish the reducing reactions and controlling the temperature of the reducing reactions by admitting, at higher levels of the fuel bed, additional sulphur dioxide preheated to a temperature below the prevailing temperature of the reacting gases at the point of admission.

ROBERT LEPSOE.